(No Model.)
G. H. LANE.
APPARATUS FOR FISHING THROUGH ICE.
No. 479,219. Patented July 19, 1892.
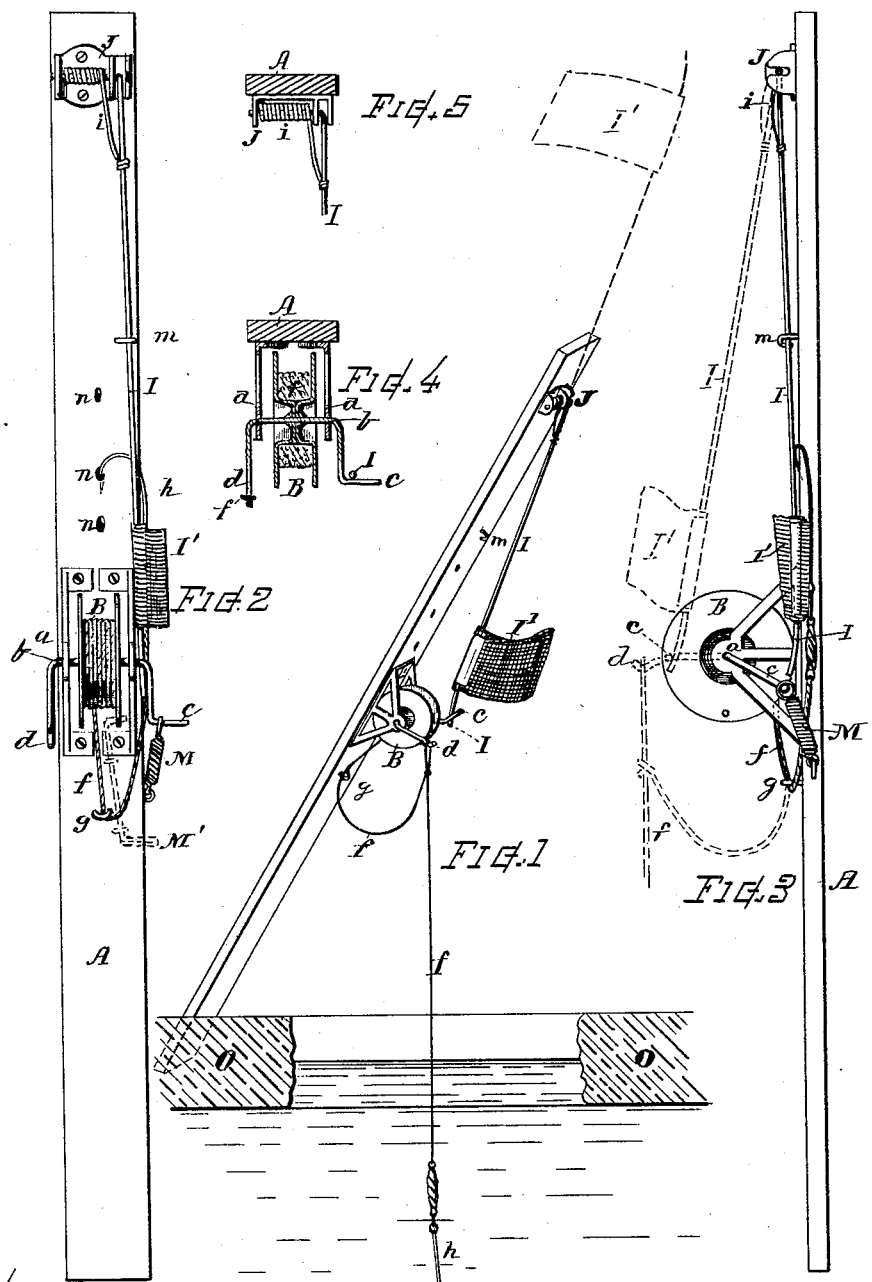
Witnesses.
Ella P. Blenus.
Simeon E. Kua
Inventor
George H. Lane
By Chas. H. Burleigh
Attorney.
THE NORRIS PETERS CO., PHOTO-LITHO., WASHINGTON, D. C.

UNITED STATES PATENT OFFICE.

GEORGE HENRY LANE, OF WORCESTER, MASSACHUSETTS.

APPARATUS FOR FISHING THROUGH ICE.

SPECIFICATION forming part of Letters Patent No. 479,219, dated July 19, 1892.

Application filed March 24, 1892. Serial No. 426,257. (No model.)

*To all whom it may concern:*

Be it known that I, GEORGE HENRY LANE, a citizen of the United States, residing at Worcester, in the county of Worcester and State of Massachusetts, have invented a new and useful Apparatus for Fishing Through Ice, of which the following, together with the accompanying drawings, is a specification sufficiently full, clear, and exact to enable persons skilled in the art to which this invention appertains to make and use the same.

The objects of my present invention are to provide an apparatus for fishing through ice, having improved means for holding the line wound up and for confining the parts of the mechanism in a close and secure position when not in use; also, to provide an efficient, practical, and desirable apparatus for ice-fishing, comprising a line-holding reel and tilt-setting devices constructed and operating in the peculiar manner as hereinafter more fully explained, and as shown in the drawings, wherein—

Figure 1 is a perspective view of my ice-fishing apparatus in position for use. Fig. 2 is a front view of the mechanism when not in use. Fig. 3 is a side view of the same, with dotted lines indicating the position of parts when the tilt is set. Fig. 4 is a transverse section through the line-reel, and Fig. 5 is a transverse section showing the tilt-spring connection.

This improved apparatus consists of a thin bar A, preferably about two feet (more or less) in length and about one and one-fourth inches in width. Upon this bar near its center there is mounted a revoluble reel B, the axle $b$ of which turns in suitable bearings $a$ $a$ and is provided with a crank $c$ at one side and a finger $d$, having a slightly-curved end, at the opposite side. The reel is best made of two pieces of thin sheet-metal circular disks offset at the center and soldered together (see Fig. 4) and fixed rigidly upon the axle $b$, which is a piece of wire bent at one end to form the crank $c$ and at the other end to form the finger $d$. The line $f$ is attached to and wound upon the reel B and is carried through a staple or guide $g$, fixed to the bar below the reel.

I indicates the tilt or swing wire, hinged to the upper part of the bar A by the bracket J or in other suitable manner and provided with a spring $i$ for throwing it upward, and I' is the red flag or marker, fixed on the end of the wire I by a tin clip set over it or by other suitable fastening. A hook or half-staple set in the bar, as at $m$, affords a means for confining the tilt by passing it beneath said hook. A spring M, attached to the side of bar and having a looped end for passing over the crank $c$, serves for confining the reel when out of use. Inclined holes $n$ are formed in the bar for receiving the point of the fish-hook $h$, as indicated.

When used, the spring M is released from the crank $c$ and the tilt I from the hook $m$. The bar is inserted at its lower end in a recess formed in the ice O adjacent to the fishing-hole, so that the bar will stand in an inclined or upright position. The hook having been baited, a sufficient length of line is dropped into the water, and a loop is then formed in the line and hung upon the curved end of the finger $d$, and the end of the tilt is brought down and caught against the crank $c$, thus setting the apparatus, as indicated in Fig. 1 and by dotted lines, Fig. 3. The end of the finger $d$ being curved prevents the line from slipping off under normal condition. When a fish takes the bait S and runs, the pull on the line depresses the finger $d$, and thereby swings the crank $c$ off the end of the tilt-wire I, which as soon as released is by its spring J thrown up to the position indicated by dotted lines, Fig. 1. The loop of line is drawn off the finger $d$ and then pays off from the reel as the fish runs. The attendant, seeing the marker up, approaches and winds in his fish by means of the crank $c$ and reel or draws the line in by hand, if he so prefers, and subsequently winds up the line and resets the tilt. When the fishing is done, the point of the hook is inserted in one of the holes $n$, the line then reeled up taut, and the loop-spring M is passed over the crank. This holds the reel from reverse action and prevents loosening of the line. The tilt-wire is pressed under the hook $m$ and its end laid under the crank, thus laying it close and secure alongside the bar.

If in any instance desired, a mortise can be formed in the bar A and the side of the reel let into the same, so that the axis of the reel will be upon or nearer to the line of the bar, the parts and operation being substantially the same as above described.

If desired in any instance, a swinging hook may be employed attached to the bar, with its point entering a hole in the rim of the reel for locking the reel in position, in lieu of the spring M. Such a device is indicated by dotted lines at M', Fig. 2. This device is best adapted to the apparatus made with the reel let into a mortise in the bar.

I claim as my invention herein, to be secured by Letters Patent—

1. The combination, substantially as described, of the support-bar, the revoluble reel, its axis supported in bearings on said bar, with its ends forming the crank $c$ and line-supporting finger $d$, as shown, and the swinging tilt or flag wire hinged at one end to said bar and provided with a spring, and its other end disposed for engagement with the reel-crank, for the purpose set forth.

2. The reel formed of two oppositely-disposed disks having offset centers secured together and the wire axial shaft passing through and rigidly fixed therein and having one of its ends bent to form the crank $c$ and the other bent to form the line-holding finger $d$, in combination with the bar, the axle-bearings fixed to said bar, the spring-pressed tilt, and the line, all substantially as and for the purposes set forth.

3. The combination, with the bar, the revoluble reel mounted in bearings thereon, and the reel-operating crank, of the spring M, having one of its ends attached to the bar and its free end formed into a loop adapted to pass over said crank, substantially as and for the purposes set forth.

4. The combination of the bar having an eye or holes $n$ formed in its front side for engaging the fish-hook, as shown, the revoluble line-reel mounted in bearings on said bar, the line-guide $g$, fixed in the front of the bar below the reel, and a holding device or hook adjacent thereto attached to the bar by eye-staples, wherein said hook can be turned forward for engaging the reel-plate, substantially as described, for retaining said reel stationary when the line is wound up and the apparatus not in use.

Witness my hand this 23d day of March, A. D. 1892.

GEORGE HENRY LANE.

Witnesses:
CHAS. H. BURLEIGH,
ELLA P. BLENUS.